United States Patent [19]

Essig

[11] Patent Number: 5,702,147
[45] Date of Patent: Dec. 30, 1997

[54] TAILGATE SEALING ARRANGEMENT

[75] Inventor: Richard C. Essig, Loveland, Colo.

[73] Assignee: Bestop, Inc., Broomfield, Colo.

[21] Appl. No.: 437,322

[22] Filed: May 9, 1995

[51] Int. Cl.[6] .................. B60J 7/08; B60J 10/10
[52] U.S. Cl. .......... 296/106; 135/119; 135/907; 160/395; 160/DIG. 8; 52/222
[58] Field of Search .................. 296/102, 106; 135/907, 119; 160/327, 328, 368.1, 290.1, 391, 392, 395, DIG. 8; 52/222; 40/603

[56] References Cited

U.S. PATENT DOCUMENTS

| | | |
|---|---|---|
| 654,993 | 7/1900 | Martin . |
| 1,294,879 | 2/1919 | Davis . |
| 1,367,928 | 2/1921 | Stolp . |
| 1,538,759 | 5/1925 | Thomas ............... 296/135 |
| 1,601,443 | 9/1926 | Haver . |
| 1,894,527 | 1/1933 | Yengst . |
| 2,020,451 | 11/1935 | Atwell ............... 296/51 |
| 2,325,500 | 7/1943 | Fosberg ............... 160/395 |
| 2,352,609 | 7/1944 | Bates . |
| 2,460,399 | 2/1949 | Schassberger . |
| 2,463,646 | 3/1949 | Schassberger ............... 296/104 |
| 2,537,611 | 1/1951 | Walton . |
| 2,610,086 | 9/1952 | Shield ............... 296/105 |
| 2,711,342 | 6/1955 | Selzer ............... 296/32 |
| 2,936,195 | 5/1960 | Schutte ............... 296/106 |
| 3,053,566 | 9/1962 | Allen ............... 296/106 |
| 3,160,436 | 12/1964 | Duddleston ............... 296/105 |
| 3,167,349 | 1/1965 | Young et al. . |
| 3,177,501 | 4/1965 | Kwake ............... 160/392 X |
| 3,201,171 | 8/1965 | Wickard ............... 296/100 |
| 3,211,492 | 10/1965 | Wozena et al. . |
| 3,373,464 | 3/1968 | Ausnit ............... 160/327 X |
| 3,391,724 | 7/1968 | Charlesworth . |
| 3,405,489 | 10/1968 | Frisk ............... 52/222 |
| 3,406,483 | 10/1968 | Mitchell ............... 49/192 |
| 3,606,448 | 9/1971 | Walker ............... 296/105 |
| 3,768,540 | 10/1973 | McSwain ............... 296/105 |
| 3,774,959 | 11/1973 | Brudy ............... 296/121 |
| 3,958,826 | 5/1976 | Upton ............... 296/78.1 |
| 4,179,152 | 12/1979 | Kent, Jr. ............... 296/196 |
| 4,188,764 | 2/1980 | Gode . |
| 4,285,539 | 8/1981 | Cole ............... 296/105 |
| 4,289,346 | 9/1981 | Bourgeois ............... 296/105 |
| 4,600,235 | 7/1986 | Frederick et al. ............... 296/106 |
| 4,757,854 | 7/1988 | Rippberger ............... 160/391 |
| 4,792,179 | 12/1988 | Stevens ............... 296/100 |
| 4,807,921 | 2/1989 | Champie, III et al. ............... 296/98 |
| 5,033,787 | 7/1991 | Takada ............... 296/102 |
| 5,058,652 | 10/1991 | Wheatley et al. ............... 296/100 X |
| 5,385,377 | 1/1995 | Girard ............... 296/100 X |
| 5,517,779 | 5/1996 | Coleman ............... 160/328 X |

FOREIGN PATENT DOCUMENTS

| | | | |
|---|---|---|---|
| 43466 | 1/1982 | European Pat. Off. ............... 52/222 |
| 569039 | 11/1993 | European Pat. Off. ............... 296/100 |
| 28378 | 9/1959 | German Dem. Rep. ............... 296/102 |
| 2306749 | 8/1973 | Germany ............... 52/222 |
| 2264596 | 7/1974 | Germany ............... 52/222 |
| 6255373 | 9/1994 | Japan ............... 296/100 |
| 992249 | 2/1983 | U.S.S.R. ............... 296/100 |
| 1214421 | 12/1970 | United Kingdom ............... 52/222 |
| 2198396 | 6/1988 | United Kingdom ............... 296/100 |

*Primary Examiner*—Dennis H. Pedder
*Attorney, Agent, or Firm*—W. Scott Carson

[57] ABSTRACT

A tailgate sealing arrangement for sport utility and other vehicles having a removable, flexible top. The sealing arrangement includes an elongated, rigid member attached to the lower section of the rear portion of the flexible top. The rigid member is removably mounted to extend across the tailgate opening and has a flexible seal depending downwardly from it. The tailgate in the preferred embodiment is mounted for pivotal movement about a vertical axis and has a horizontally extending, flat, upper surface. In operation and as the tailgate is closed, the depending seal contacts and wipes across the flat, upper surface of the tailgate to form an effective sealing arrangement. All of this is done without having to disturb or otherwise manipulate the top.

18 Claims, 5 Drawing Sheets

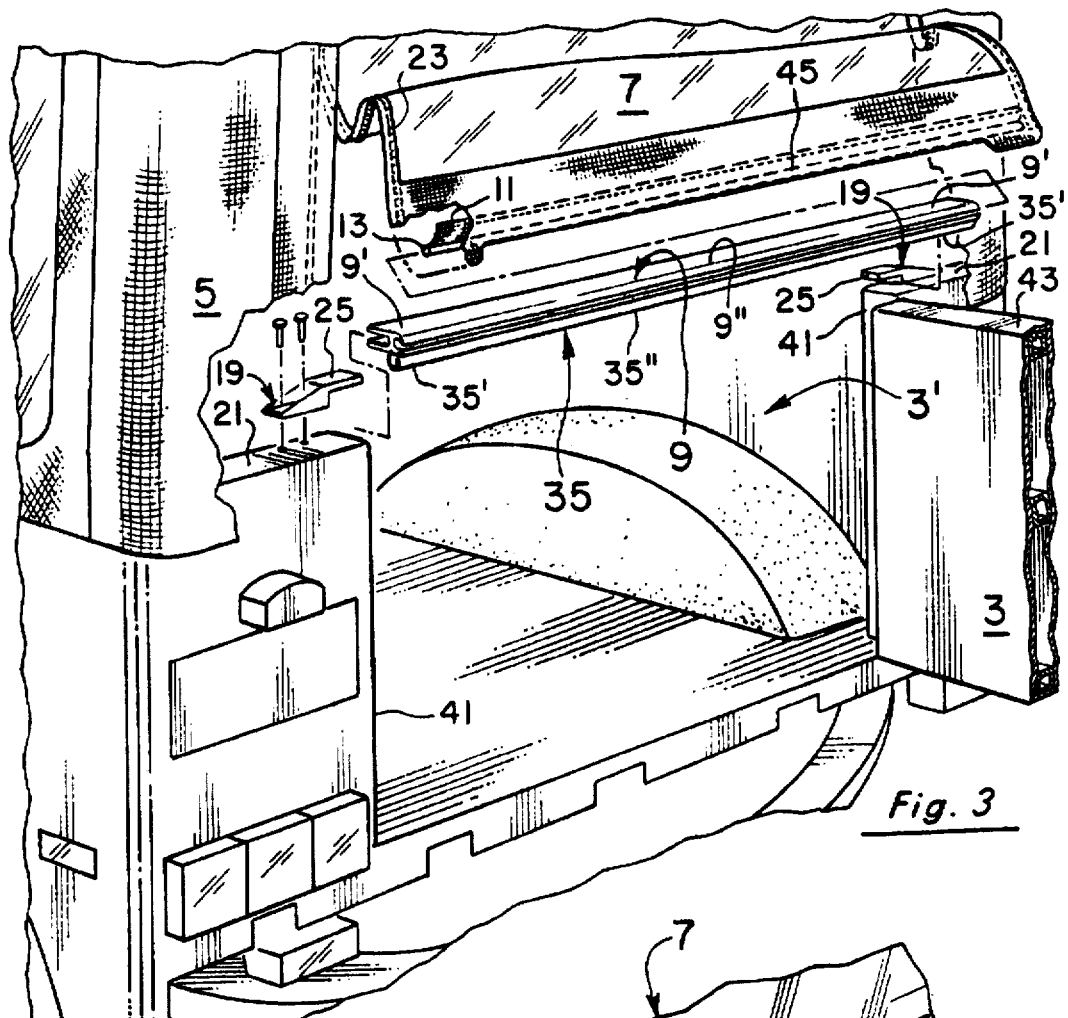
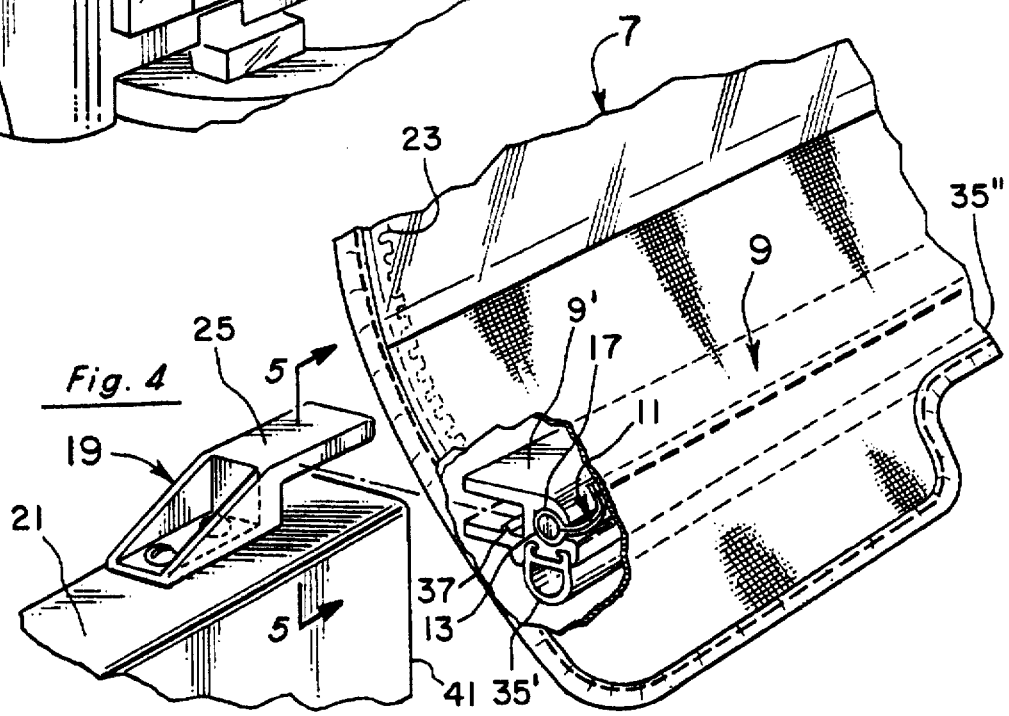

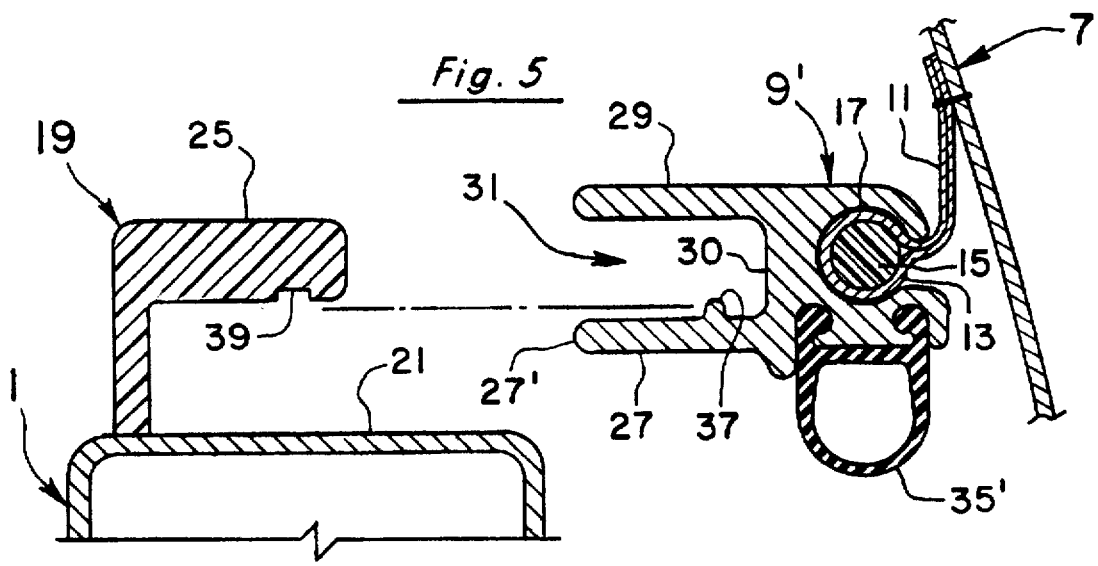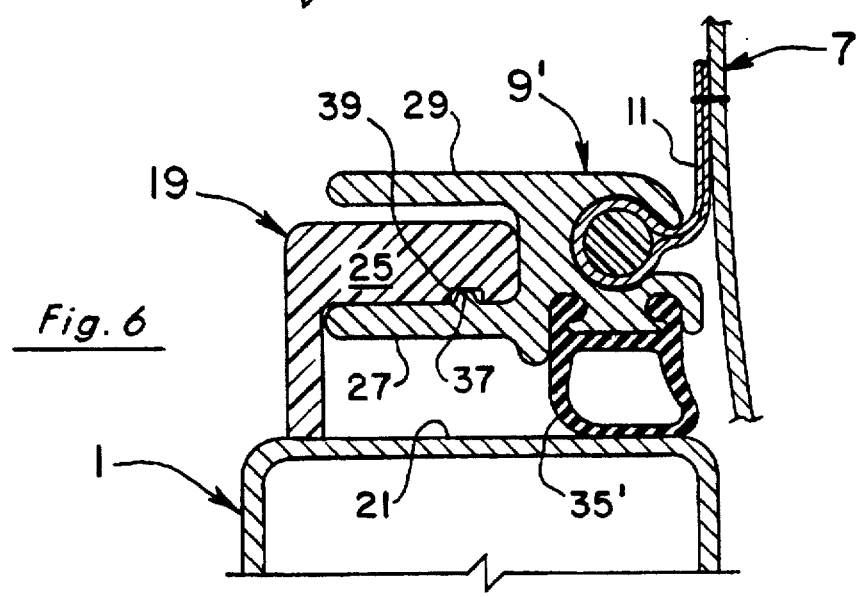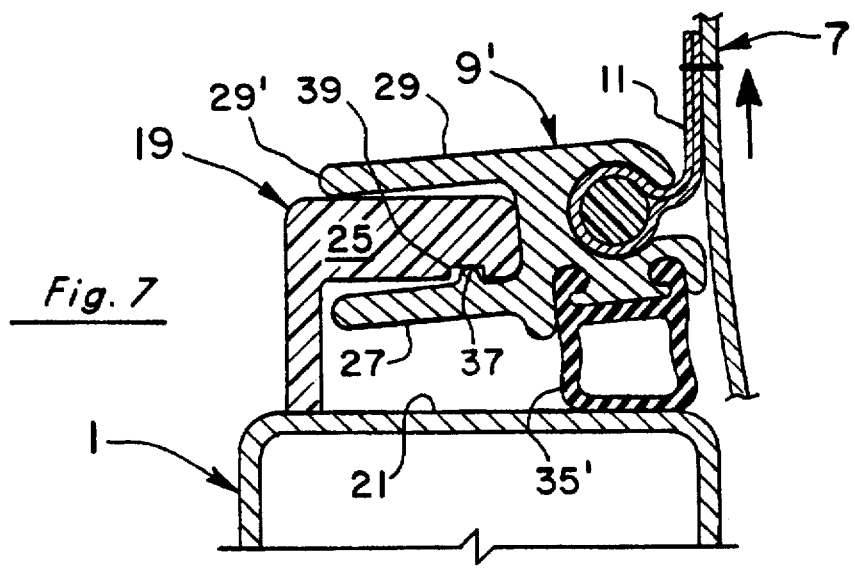

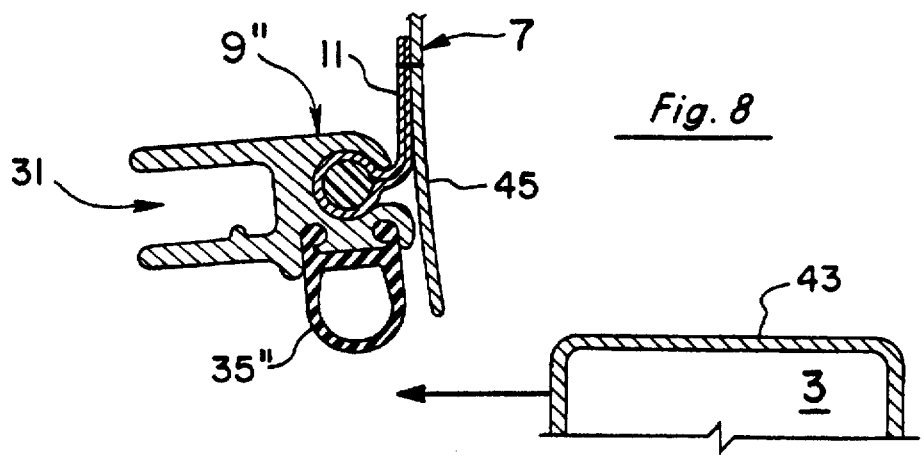
*Fig. 8*
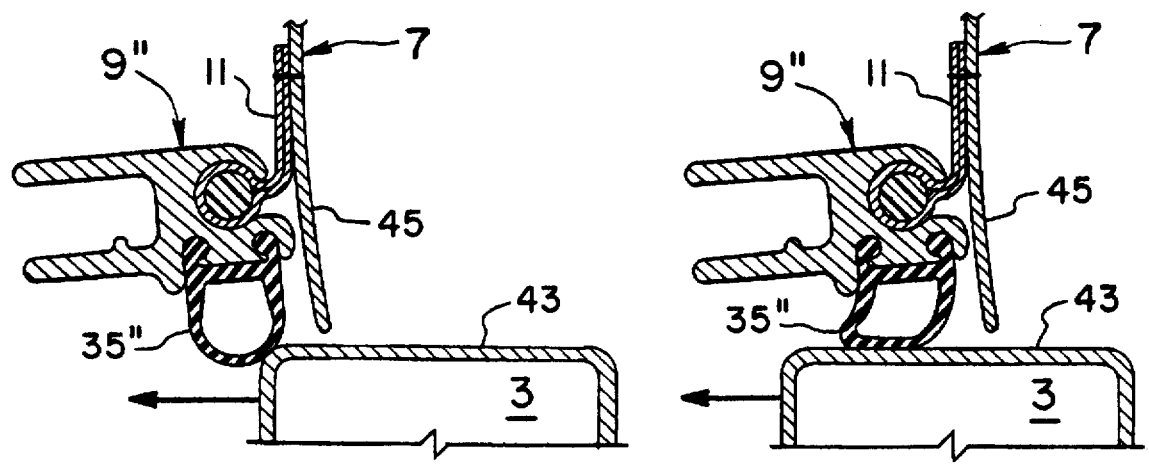
*Fig. 9*   *Fig. 10*
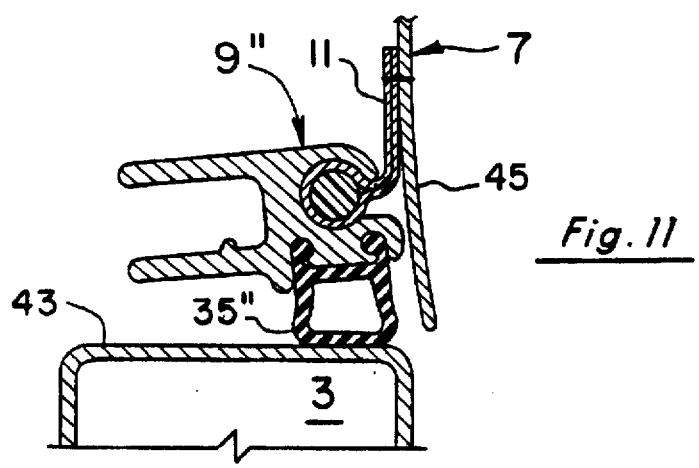
*Fig. 11*

TAILGATE SEALING ARRANGEMENT

BACKGROUND OF THE INVENTION

1. Field of the Invention

This invention relates to the field of tailgate sealing arrangements and more particularly to the field of tailgate sealing arrangements for vehicles with flexible tops and tailgates having flat, upper surfaces.

2. Discussion of the Background

Providing effective sealing arrangements between vehicle tailgates and the rear portions of vehicle tops has always presented challenging design problems. These problems are particularly prevalent in sport utility and other vehicles which have removable, flexible tops of fabric-like material such as canvas or vinyl. Co-owned U.S. Pat. No. 4,600,235 taught a very commercially successful approach to sealing a tailgate with a vertically extending lip or surface against a rigid crossbar attached to the flexible top. In subsequent modifications, the seal of this patented system was vertically mounted on the crossbar. The vertically extending lip of the tailgate then closed against the vertically extending seal. This patented arrangement had the distinct, commercial advantage that the flexible top did not have to be attached or otherwise secured to the tailgate to be held in place or to form an effective seal. The tailgate could then be opened and closed without disturbing the top. In this manner, the user could move objects into and out of the vehicle by simply opening just the tailgate without having to manipulate or otherwise disturb the flexible top.

In this light, the present invention was developed. With it, the commercially attractive feature of being able to operate the tailgate without disturbing the flexible top was successfully adapted to a vehicle having a tailgate with a horizontally extending, flat, upper surface rather than the vertically extending lip of the prior art.

SUMMARY OF THE INVENTION

This invention relates to tailgate sealing arrangements for sport utility and other vehicles having removable, flexible tops. The sealing arrangement includes an elongated, rigid member attached to the lower section of the rear portion of the flexible top. The rigid member is removably mounted to extend across the tailgate opening and has a flexible seal depending downwardly from it. The tailgate in the preferred embodiment is mounted for pivotal movement about a vertical axis and has a horizontally extending, flat, upper surface. In operation and as the tailgate is closed, the depending seal contacts and wipes across the flat, upper surface of the tailgate to form an effective sealing arrangement. All of this is done without having to disturb or otherwise manipulate the top.

In the preferred embodiment, the rigid member or crossbar is removably mounted at its ends to clips secured to the vehicle on either side of the tailgate opening. Each clip has a horizontally extending flange which is slideably received between the legs of a U-shaped channel on each end of the rigid member. Each U-shaped channel is slightly oversized relative to the flange and the channel and flange of each clip are provided with a mating protuberance and recess arrangement to lock the two pieces in place. In operation, the rigid member with the flexible top attached to it is manually manipulated to slide its U-shaped channels onto the flanges of the respective clips. In doing so, the flexible top is drawn taut and placed under tension. Upon releasing the rigid member, the resilient force of the stretched top and compressed seal causes the oversized U-shaped channels to cock or rotate on the clips. This seats the protuberance in the mating recess and helps to lock the rigid member in place. Also, as the tailgate is closed and compresses the remaining portion of the resilient seal suspended over the tailgate opening, additional force is applied to the rigid bar by this compressed portion of the seal to further enhance this cocking and locking of the U-shaped channels on the respective clip flanges.

BRIEF DESCRIPTION OF THE DRAWINGS

FIG. 3 is a partially exploded view of the rear of the vehicle illustrating the components of the sealing arrangement.

FIG. 4 is a detail view showing the rear portion of the top as attached to the elongated, rigid member of the sealing arrangement and further showing one of the retaining clips mounted on the side of the tailgate opening.

FIGS. 5–7 sequentially illustrate how the elongated, rigid member of the sealing arrangement is removably mounted to the retaining clips on the vehicle.

FIGS. 8–11 sequentially illustrate how the depending seal contacts and wipes across the horizontally extending, flat, upper surface of the tailgate as the tailgate is moved to its closed position.

DETAILED DESCRIPTION OF THE PREFERRED EMBODIMENTS

Figure 1:
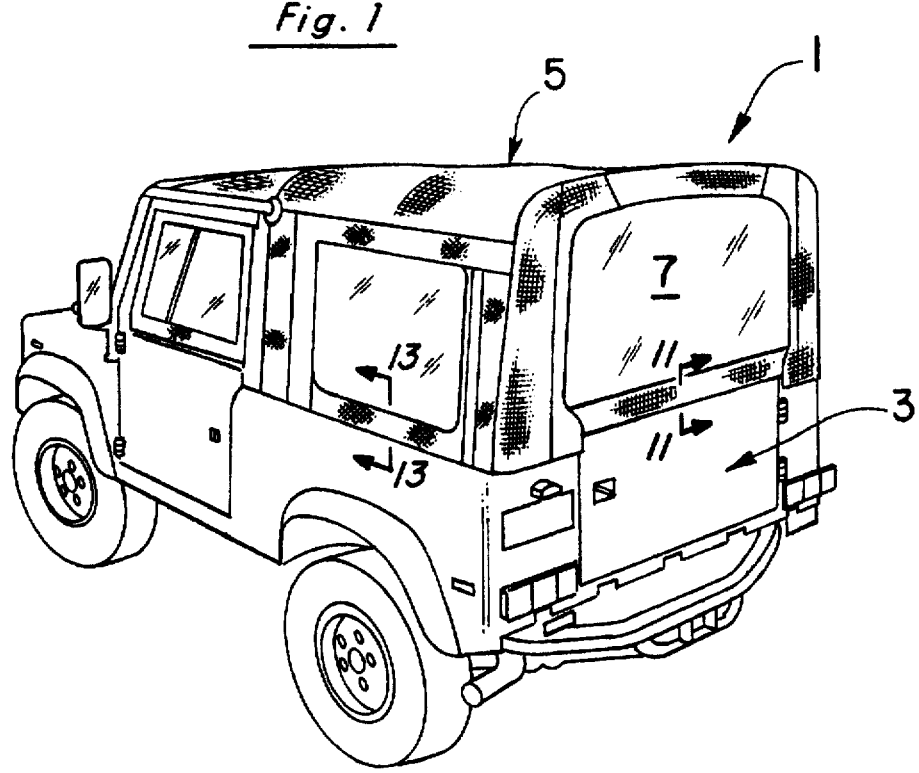
FIG. 1 is a rear view of a vehicle employing the tailgate sealing arrangement of the present invention.
Figure 2:
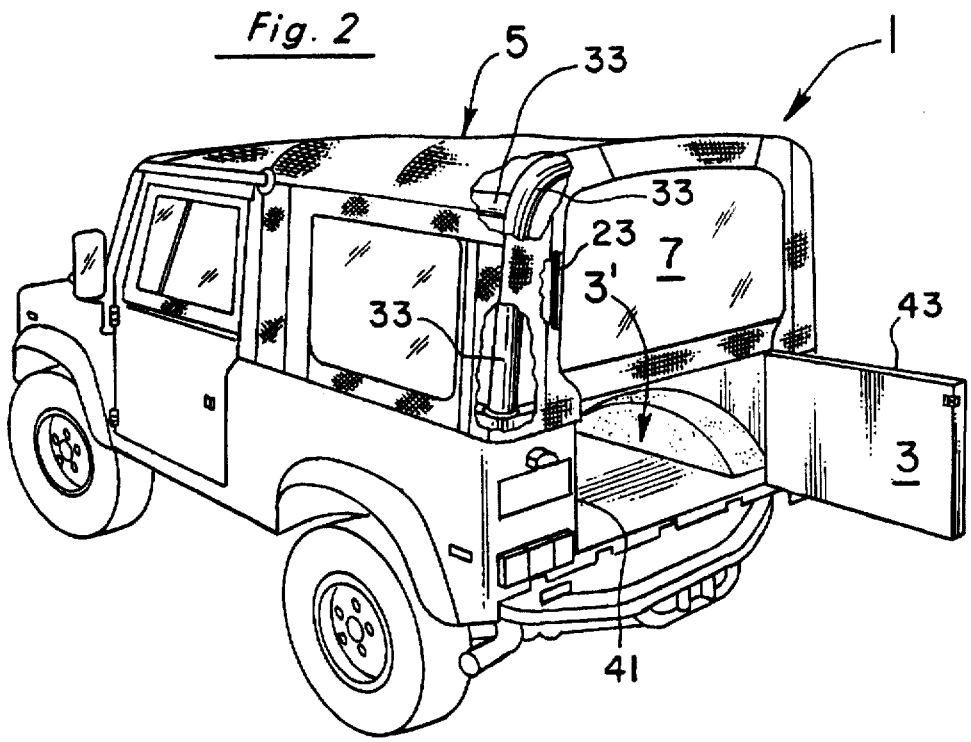
FIG. 2 is a view similar to FIG. 1 showing the tailgate of the vehicle in an open position providing access to the interior of the vehicle.

FIG. 1 illustrates the tailgate sealing arrangement of the present invention in use with a vehicle 1 with the tailgate 3 of the vehicle 1 shown in its closed position. In FIG. 2, the tailgate 3 is shown in its open position providing access through the tailgate opening 3' to the interior of the vehicle 1. In such operation as best seen in these FIGS. 1 and 2, the arrangement of the present invention allows the tailgate 3 to be opened and closed independently of the rear portion 7 of the flexible top 5. That is, and unlike most tailgate sealing arrangements, the present invention enables the user to operate the tailgate 3 without having to manipulate the rear portion 7 of the flexible top 5. Objects can then be easily and quickly placed into or taken out of the vehicle 1 through the tailgate opening 3' by simply opening and closing just the tailgate 3. With the present invention, there is no need to undo or redo any attachments between the rear portion 7 of the flexible top 5 and the tailgate 3.

More specifically, the tailgate sealing arrangement of the present invention includes a relatively rigid, elongated member or crossbar 9 (see the partially exploded view of FIG. 3). As illustrated, this rigid crossbar 9 has end portions 9' and a middle portion 9". To this rigid member 9, the rear portion 7 of the flexible top 5 is attached adjacent the horizontally extending, lower section 11. This can be done in any number of ways. In the illustrated one as best seen in FIG. 5, a sleeve-dowel arrangement 13, 15 is slideably received in the C-shaped channel 17 on the outer or right side of the rigid member 9' in FIG. 5. Retainer clips 19 are then mounted to the vehicle 1 on respective sides of the tailgate opening 3' (see again FIG. 3) on the horizontal surfaces 21. In operation and to initially secure the rigid member 9 and attached rear portion 7 of the flexible top 5 to the clips 19, the side zippers 23 of the rear portion 7 are preferably first undone from the remainder of the flexible top 5. As illustrated in FIGS. 5–7, the rigid member 9 with the rear portion 7 of the top 5 attached thereto is then manually moved to receive the horizontal flange 25 on each clip 19 in the U-shaped channel 31. In doing so, the flange 25 is received between the substantially parallel legs 27, 29 of the U-shaped channel 31 in each end portion 9' of the rigid member 9.

In this regard as shown in FIGS. 5–7, the entire rigid member 9 including its end portions 9' ends up cocked or rotated about the horizontal member or flange 25 of each clip 19 (see FIG. 7). This is a result of a number of things including the slight oversizing of the U-shaped channel 31 relative to the flange 25. The legs 27, 29 of the U-shaped channel 31 in each end portion 9' are then spaced apart a distance greater than the thickness of the flange 25. Additionally, the flexible top 5 is made of slightly stretchable, resilient material. The top 5 is also supported on the bow structure 33 (see FIG. 2) of the vehicle 1 so that the rear portion 7 of the flexible top 5 is manually stretched and placed under tension in the positions of FIGS. 5 and 6. Consequently, in the released position of FIG. 7, the upward force of the stretched, resilient rear portion 7 of the top 5 causes the rigid member 9 to be rotated about the horizontal flange 25. Also, the flexible, bulb seal 35 depends downwardly from and extends along the rigid member 9. In operation, the outer, end parts 35' of seal 35 (see FIG. 7) are also compressed and sealingly engage the horizontal surfaces 21 on either side of the tailgate opening 3'. This compression of the outer end parts 35' of the resilient seal 35 further tends to cock or rotate the rigid member 9 about the flange 25.

To help maintain the rigid member 9 on the flange 25, a locking arrangement is provided with each pair of U-shaped channel 31 and flange 25. This arrangement includes a rib or protuberance 37 and mating recess 39 (see FIGS. 5–7). These mating members 37, 39 could be respectively on either of members 9 and 19 but in the preferred embodiment, the protruding rib 37 is on the lower leg 27 of the U-shaped channel 31 and the recess 39 is in the lower surface of flange 25. The rib protuberance 37 as illustrated is also preferably located along the leg 27 between its free end 27' (see FIG. 5) and the base 30 of the U-shape 31. The thickness of the flange 25 is preferably less than the spacing of the legs 27, 29 minus the distance the protuberance 37 extends inwardly from the leg 27. In the preferred manner of operation as shown in FIGS. 5–7, each end portion 9' is first manually manipulated to slide the protuberance 37 into alignment with the recess 39 (see FIGS. 5–6). Rigid member 9 is then released and rotates to the position of FIG. 7 under the upward forces of the tensioned rear portion 7 of the top 5 and the compressed, resilient seal at 35'. In the position of FIG. 7 with the protuberance 37 mated in the recess 39 and the free end 29' of leg 29 of the U-shaped channel 31 abutting the flange 25, the rigid member 9 is held firmly in place. For ease of assembly, the recess 39 as shown is preferably larger than the protuberance 37 wherein the protuberance 37 tends to lock against one side or lip of the recess 39. The downwardly extending, rear portion 7 of the flexible top 5 can thereafter be zipped back to the remainder of the top 5 to assume the position of FIG. 2. At this point, the rigid member 9 is attached at each end portion 9' to the respective clips 19. The rigid member 9 is also supported or suspended across the top of the tailgate opening 3' between the upper portions of the vertically extending walls 41 defining the tailgate opening 3' (see FIGS. 2 and 3).

In the preferred embodiment, the tailgate 3 is mounted for pivotal movement about a vertical axis but could be mounted for movement about a horizontal axis. In either case as illustrated in FIGS. 8–11 (which are taken essentially along line 11—11 of FIG. 1), the tailgate 3 is preferably mounted so that the substantially flat, upper surface 43 of the tailgate 3 moves along a path interrupting the suspended, central portion 35" of the flexible seal 35. In this manner, the tailgate surface 43 strikes the lower section of the hollow, bulb seal 35" (FIG. 9). The seal 35" is then compressed (FIG. 10) and wipes across the flat, upper surface 43 of the tailgate 3 as the tailgate 3 is closed to the position of FIG. 11. This creates a very effective seal. Additionally, the compression of the resilient seal 35" against the upper surface 43 aids in maintaining the rigid member 9 in its cocked or rotated, locked position of FIG. 7. In this regard as previously explained, the upward forces of the rear portion 7 of the resilient top 5 and compressed end parts 35' of the seal 35 act against the vehicle surfaces 21 on either side of the tailgate opening 3' (see FIG. 7). This initially cocks or rotates the entire rigid member 9 into its locked position of FIG. 7. Thereafter, when the tailgate 3 is closed and its flat, upper surface 43 contacts and compresses the middle or remainder 35" of the seal 35 suspended across the tailgate opening 3' (FIGS. 10 and 11), the rigid member 9 is really not rotated beyond the locked position of FIG. 7. Rather, the additional compression of the middle seal portion 35" against the tailgate surface 43 will generate additional force or pressure tending to keep the rigid member 9 in its locked position. In this manner, the rigid member 9 remains in the position of FIG. 7 and is held in this position as the tailgate 3 is closed in the sequence of FIGS. 8–11. Although the compressible, resilient, bulb seal 35 of FIGS. 8–11 is preferred, other depending seals such as a lip seal could also be used. Additionally, as discussed above, the tailgate 3 can be mounted to pivot about a horizontal axis wherein the flat, upper surface 43 of the tailgate 3 would be essentially horizontal in its closed position of FIG. 11. The flat, upper surface 43 is also preferably at least two and even three or more times as wide as the seal 35. The rearwardly extending member 45 in FIGS. 8–11 is simply a rain flap to help direct moisture over the sealing arrangement.

The flexible top 5 as discussed above is stretchable and resilient. Such stretching and resiliency are fairly limited in the sense of a canvas fabric or vinyl. Nevertheless, the flexible top 5 can be draped over the bows 33 or other support frame of the vehicle 1 (see FIG. 2) and pulled taut to stretch a half inch or so. This places the top 5 under slight tension and the resulting force of such tension is used as explained above to cock or rotate the rigid member 9 (e.g., extruded aluminum) on the horizontal flange 25 of each clip 19. Such tension is also used in the present invention to help hold the top 5 in the side fasteners 2 on the vehicle 1 (see FIGS. 1 and 13).

Figure 12:
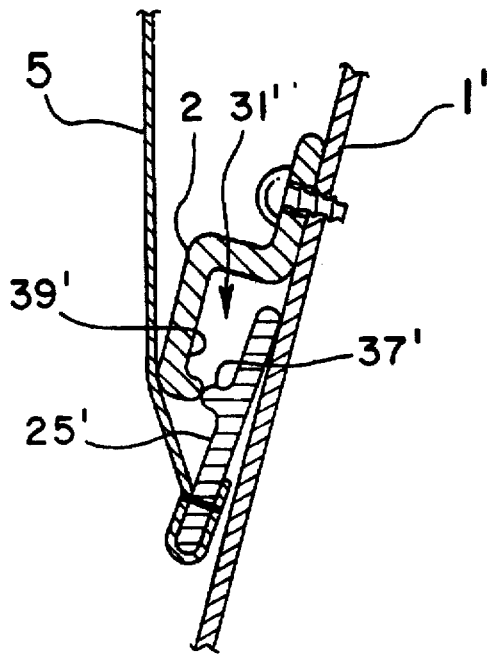
FIGS. 12–14 illustrate the manner in which the flexible top can be fastened to the sides of the vehicle with a retainer arrangement employing the locking protuberance and recess arrangement of FIGS. 5–7.
Figure 13:
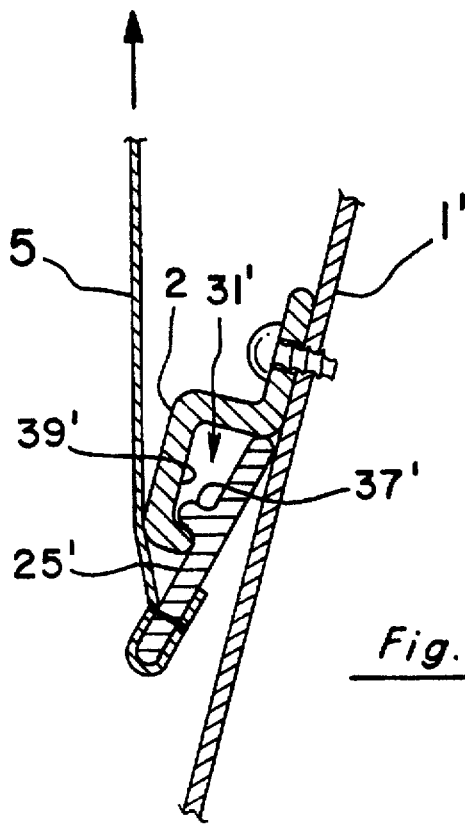
Figure 14:
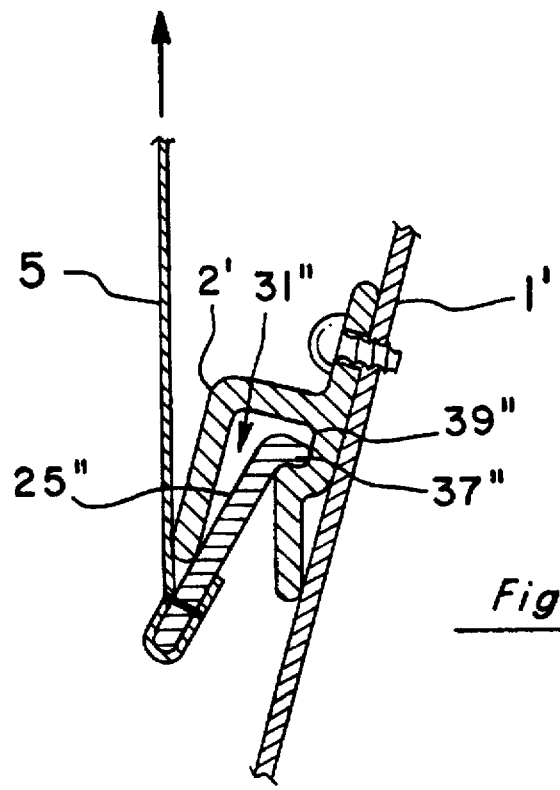

In this fastener adaptation of the co-owned U.S. Pat. No. 4,757,854, the side retaining system is additionally provided with the basic locking arrangement of protuberance 37 and recess 39 of FIGS. 5–7. More specifically and as illustrated in FIG. 12, a U-shaped channel 31' is formed by mounting member 2 to the side of the vehicle body 1'. The flexible top 5 is then sewn or otherwise attached to the relatively rigid belt or flange 25' and the flange 25' inserted into the U-shaped channel 31' formed by member 2 (FIG. 12). This stretches and pulls the top 5 taut. Once inserted and upon releasing the flange 25', the protuberance 37' (see FIG. 13) engages the lip of the recess 39' to lock the flange 25' in place. In the modification of FIG. 14, the recess 39" is adjacent the vehicle body 1' in a leg of the channel member 2' and the protuberance 37" locks into the recess 39". The U-shaped channels 31' and 31" of FIGS. 12–14 are formed by and described in terms of members attached to or mounted on the vehicle body 1'. However, such U-shaped channels could obviously be made integral with the vehicle body (e.g., additional metal sheet or molded plastic portion of the vehicle body itself). The intent is to make the U-shaped channel essentially a part of the vehicle. The locking arrangements of FIGS. 12–14 could also be operable in other positions relative to the top 5 as long as the top 5 applied forces on the flanges 25' and 25" which were generally directed away from or along the vehicle body 1'.

While several embodiments of the present invention have been shown and described in detail, it is to be understood that various changes and modifications could be made without departing from the scope of the invention.

I claim:

1. A vehicle having a tailgate and a flexible top with a downwardly extending rear portion, said vehicle including means for mounting said tailgate for movement independently of said flexible top between an open position providing access to the interior of the vehicle through a tailgate opening in the rear of the vehicle and a closed position preventing access to the interior through said tailgate opening, said rear portion of said flexible top having a lower section extending substantially horizontally and said tailgate having an upper, substantially flat surface with said flat surface extending substantially horizontally in said closed position and an arrangement for sealingly engaging the lower section of the rear portion of said flexible top and the substantially flat, upper surface of said tailgate in said closed position, said arrangement including a substantially rigid, elongated member attached to the lower section of the rear portion of said flexible top, said rigid member having end portions spaced from each other, said arrangement further including a flexible seal mounted to said rigid member and extending therealong substantially between the end portions of said rigid member and means for removably mounting said rigid member to said vehicle in a first position extending across the tailgate opening with said flexible seal extending downwardly and substantially across said tailgate opening and sealingly engaging the horizontally extending, flat, upper surface of said tailgate in said closed position whereby said tailgate can be moved between said closed and opened positions independently of said flexible top without removing said rigid member from said first position mounted across said tailgate opening with the lower section of the rear portion of said flexible top attached thereto.

2. The vehicle of claim 1 further including means for moving said flat, upper surface of said tailgate along a path intercepting said flexible seal wherein said flexible seal wipes across said flat, upper surface of said tailgate as said tailgate moves toward said closed position.

3. The vehicle of claim 2 wherein said flexible seal and said flat surface have respective widths and the width of said flat surface is greater than the width of said flexible seal.

4. The vehicle of claim 3 wherein the width of said flat surface is at least twice the width of said flexible seal.

5. The vehicle of claim 2 wherein said flexible seal is a hollow, bulb seal and the path of the flat, upper surface of said tailgate as said tailgate moves toward said closed position intercepts a lower section of said seal.

6. The vehicle of claim 2 wherein said tailgate mounting means mounts said tailgate for pivotal movement between said open and closed positions about a substantially vertical axis.

7. The vehicle of claim 1 wherein said tailgate mounting means mounts said tailgate for pivotal movement between said open and closed positions about a substantially vertical axis.

8. The vehicle of claim 1 wherein said tailgate opening is defined in part by two vertically extending walls in the rear of the vehicle, said walls being spaced a first distance apart and said flexible seal extending along said rigid member for a distance at least equal to said first distance.

9. The vehicle of claim 8 wherein said flexible seal extends along said rigid member for a distance greater than said first distance.

10. The vehicle of claim 9 wherein said vehicle has substantially horizontal surfaces respectively extending outwardly of said vertically extending walls of said tailgate opening and said rigid member is mounted so that parts of said seal adjacent the end portions of said rigid member sealingly engage said horizontal surfaces outwardly of said tailgate opening.

11. The vehicle of claim 1 wherein said tailgate opening is defined in part by two vertically extending walls in the rear of the vehicle, said vertical walls having upper and lower portions, said rigid member in said first position being mounted to extend across the tailgate opening substantially between the upper portions of said vertical walls.

12. The vehicle of claim 1 wherein said means for removably mounting said rigid member to said vehicle in said first position extending across said tailgate opening includes first and second clips mounted to said vehicle on respective sides of said tailgate opening.

13. The vehicle of claim 12 wherein each of said clips includes a first member extending substantially horizontally and each end portion of said rigid member includes a substantially U-shaped channel, said first member of each clip being respectively received in said U-shaped channel of the respective end portion of the rigid member to maintain the rigid member in said first position extending across the tailgate opening.

14. The vehicle of claim 13 wherein said horizontal member of each clip respectively received in the U-shaped channel of each end portion of said rigid member has means for locking the member and channel in place.

15. The vehicle of claim 14 wherein said locking means of each pair includes a mating protuberance and recess.

16. The vehicle of claim 15 wherein the U-shaped channel of each pair has two legs and a base and the protuberance of each pair is on one of the legs of the U-shaped channel and the recess is in the horizontal member of the clip.

17. The vehicle of claim 16 wherein the one leg of said U-shaped channel extends from the base of said U-shaped channel to a free end and said protuberance is located along said one leg spaced from said free end toward said base.

18. The vehicle of claim 16 wherein the legs of each U-shaped channel are spaced apart a first distance and said horizontal member of each clip has a thickness less than the first distance and said improvement further includes means for rotating said U-shaped channel about said horizontal member to mate said protuberance in said recess to lock said U-shaped channel on said horizontal member.

* * * * *